(12) United States Patent
Haro-Valdez et al.

(10) Patent No.: US 11,885,438 B2
(45) Date of Patent: Jan. 30, 2024

(54) CHOKE VALVE

(71) Applicant: Lancaster Flow Automation, LLC, Houston, TX (US)

(72) Inventors: Gerardo Haro-Valdez, Houston, TX (US); Weston William Woods, Spring, TX (US); Md. Monirul Islam, Houston, TX (US); Joshua Green, Houston, TX (US)

(73) Assignee: Lancaster Flow Automation, LLC, Houston, TX (US)

( * ) Notice: Subject to any disclaimer, the term of this patent is extended or adjusted under 35 U.S.C. 154(b) by 137 days.

(21) Appl. No.: 17/217,851

(22) Filed: Mar. 30, 2021

(65) Prior Publication Data
US 2021/0301944 A1  Sep. 30, 2021

Related U.S. Application Data

(60) Provisional application No. 63/002,091, filed on Mar. 30, 2020.

(51) Int. Cl.
| | | |
|---|---|---|
| *F16K 47/04* | (2006.01) | |
| *F16K 5/04* | (2006.01) | |
| *F16K 3/34* | (2006.01) | |
| *F16K 31/53* | (2006.01) | |
| *F16K 3/08* | (2006.01) | |

(52) U.S. Cl.
CPC ............. *F16K 47/045* (2013.01); *F16K 3/34* (2013.01); *F16K 5/0407* (2013.01); *F16K 3/085* (2013.01); *F16K 31/535* (2013.01)

(58) Field of Classification Search
CPC ........ F16K 5/0407; F16K 3/34; F16K 31/535; F16K 3/085; F16K 47/045
See application file for complete search history.

(56) References Cited

U.S. PATENT DOCUMENTS

| | | | | |
|---|---|---|---|---|
| 3,780,758 | A * | 12/1973 | DeVries | F16K 25/00 137/454.6 |
| 3,987,819 | A * | 10/1976 | Scheuermann | F16K 11/18 137/636.2 |
| 4,532,961 | A * | 8/1985 | Walton | F16K 47/045 251/212 |
| 4,621,659 | A * | 11/1986 | Pawelzik | F16K 11/0787 137/625.4 |
| 4,674,537 | A * | 6/1987 | Bergmann | F16K 3/085 251/208 |
| 4,887,793 | A * | 12/1989 | Hernandez | F16K 3/34 251/304 |

(Continued)

*Primary Examiner* — Matthew W Jellett
*Assistant Examiner* — Christopher D Ballman
(74) *Attorney, Agent, or Firm* — Phillip Black

(57) ABSTRACT

A choke valve and a method of operation of the choke valve in which the choke valve includes an orifice plate and/or a guide vane to control a flow of fluid though the choke valve, the orifice plate defining a center point and being rotatable about a center axis extending longitudinally through the center point; the orifice plate defining at least one aperture including a first aperture, the first aperture defining at least a first equi-incremental phase region, the first aperture being spaced away from the center point of the orifice plate; and rotation of the orifice plate with respect to the center point effecting an incremental and staged transitioning of the orifice plates among a plurality of open states.

24 Claims, 14 Drawing Sheets

(56) References Cited

U.S. PATENT DOCUMENTS

| | | | | |
|---|---|---|---|---|
| 4,946,134 | A * | 8/1990 | Orlandi | F16K 3/34 |
| | | | | 251/208 |
| 5,054,521 | A * | 10/1991 | Hendrick | F16K 3/314 |
| | | | | 137/625.3 |
| 5,308,040 | A * | 5/1994 | Torres | F16K 11/074 |
| | | | | 251/249.5 |
| 5,372,224 | A * | 12/1994 | Samonil | F16F 9/468 |
| | | | | 188/282.3 |
| 5,881,999 | A * | 3/1999 | Chen | F16K 3/085 |
| | | | | 251/352 |
| 5,934,320 | A * | 8/1999 | O'Reilly | F16K 3/04 |
| | | | | 137/625.21 |
| 6,076,872 | A * | 6/2000 | Harter | F16K 3/34 |
| | | | | 294/186 |
| 6,880,575 | B2 * | 4/2005 | Mountford | F16K 37/0091 |
| | | | | 137/625.41 |
| 7,526,911 | B2 * | 5/2009 | Pickard | F02C 7/232 |
| | | | | 60/39.281 |
| 7,726,338 | B2 * | 6/2010 | Clasen | F16K 3/085 |
| | | | | 251/304 |
| 9,400,057 | B2 * | 7/2016 | Tuineag | F16K 31/44 |
| 9,657,464 | B2 * | 5/2017 | Dunki-Jacobs | F16K 11/0743 |
| 9,835,257 | B2 * | 12/2017 | Tuineag | F16K 3/32 |
| 10,619,899 | B2 * | 4/2020 | Willers | F16K 11/0853 |
| 10,969,024 | B2 * | 4/2021 | Tsai | F16K 5/10 |
| 2008/0203345 | A1 * | 8/2008 | Burkhard | F16K 47/045 |
| | | | | 137/601.16 |
| 2018/0127965 | A1 * | 5/2018 | Beach | E03F 1/006 |
| 2019/0331236 | A1 * | 10/2019 | Singh | A61M 1/3666 |

* cited by examiner

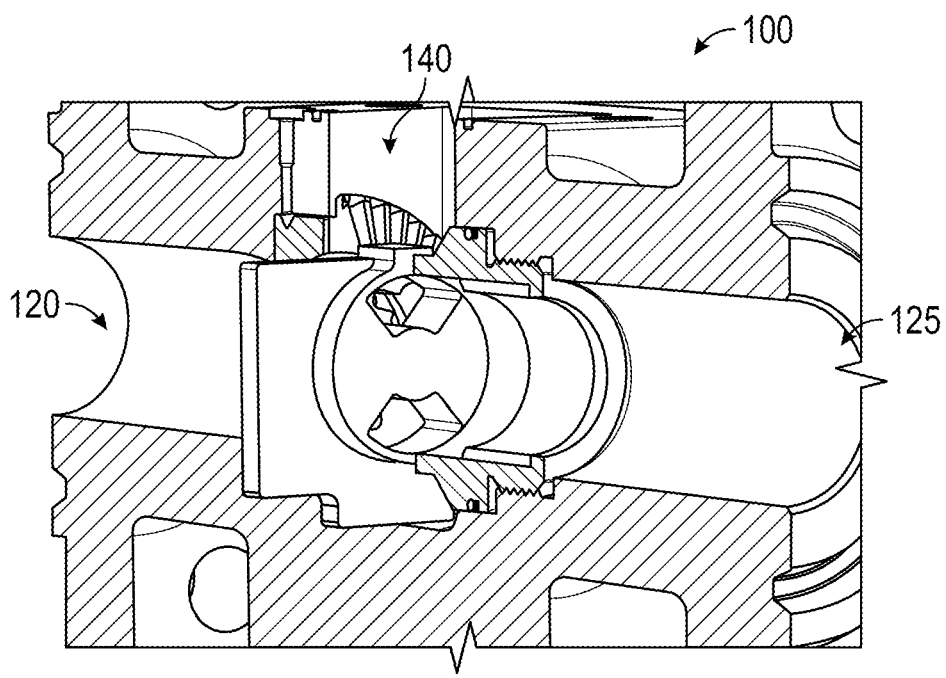
FIG. 4A
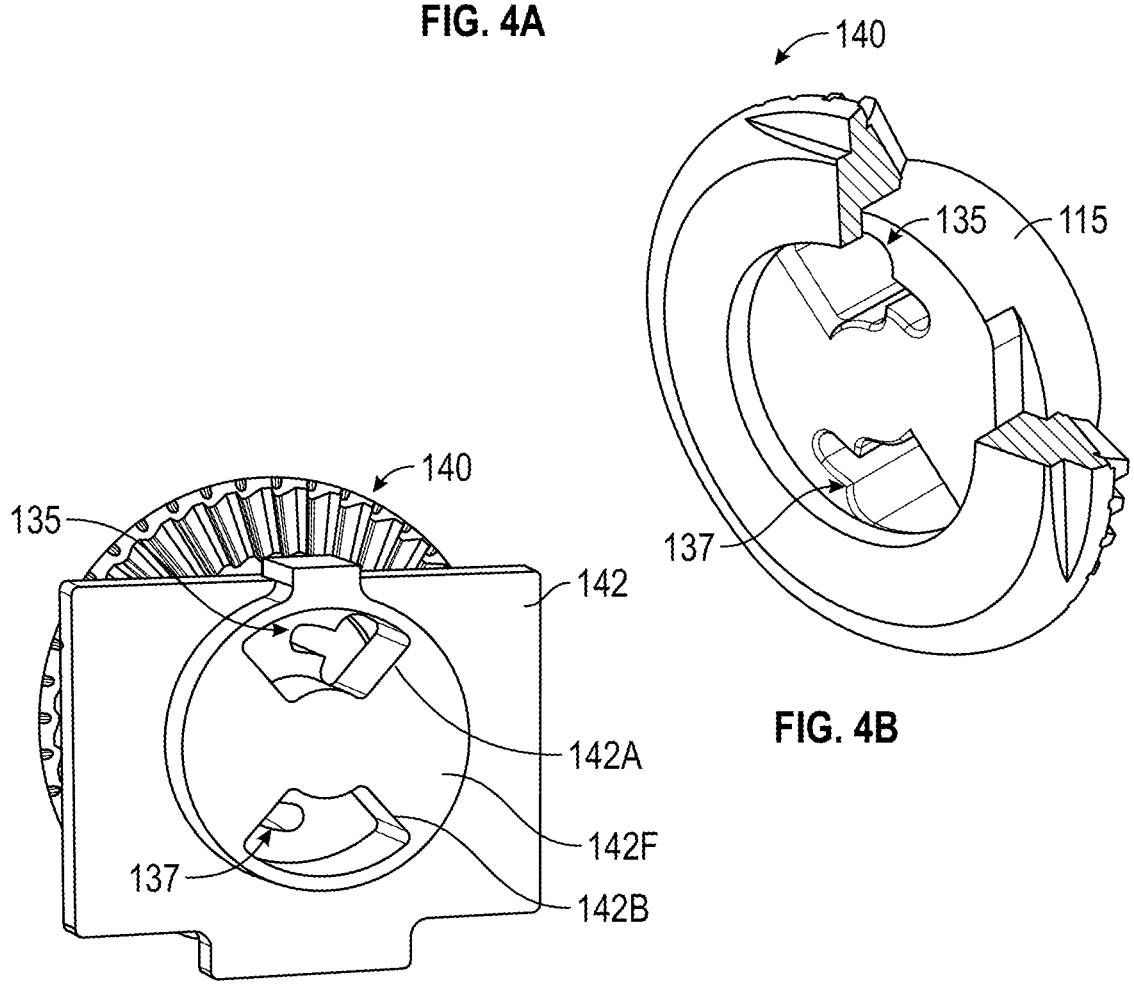
FIG. 4B
FIG. 4C

Fluid Surface Velocity of Flow Guide and Trim, X (in/s)

CHOKE VALVE

CROSS REFERENCE TO RELATED APPLICATIONS

The present application claims priority to and the benefit of U.S. Prov. Pat. App. Ser. No. 63/002,091, which was filed on Mar. 30, 2020, which to the extent that it is consistent with the present disclosure is hereby incorporated herein by reference in its entirety.

BACKGROUND

Choke valves, such as inline choke valves, are frequently used to control a fluid flow rate or downstream pressure in a fluid line. Choke valves are used in various applications including, for example and without limitation, hydrocarbon production, hydrocarbon producing platforms, surface wellheads, subsea trees, surface manifolds, subsea manifolds, onshore hydrocarbon wells, floating production vessels, and storage and offshore loading vessels. This list is neither exclusive nor exhaustive.

Fluids controlled by choke valves may include well fluids, production hydrocarbons, and mixtures of fluids, e.g., oil, gas, hydrogen sulfide, carbon dioxide, and/or water, and particles or impurities, e.g., sand or rocks. Again, this list is neither exclusive nor exhaustive. Through the operation such choke valves, flow and pressure may be balanced, thereby increasing the life of a reservoir and the recovery of hydrocarbon products.

During operation, due to properties of fluids flowing through choke valves, certain internal choke valve components may erode or otherwise experience wear. Wear to such internal components may result in a choke valve that is not capable of functioning as intended, thereby resulting in expensive repairs or loss of hydrocarbon recovery. Examples of internal components that may experience wear includes choke valve bodies, orifice plates, and the like.

SUMMARY

In an embodiment of the present disclosure, a choke valve may include: a valve body having an internal cavity; and an orifice plate disposed within the internal cavity of the valve body to control a flow of fluid though the choke valve. The orifice plate may include: a center point and being rotatable about a center axis extending longitudinally through the center point; and a first aperture extending through a face of the orifice plate, the first aperture defining at least a first equi-incremental phase region, the first aperture being spaced away from the center point of the orifice plate.

Rotation of the orifice plate with respect to the center point may effect transitioning of the orifice plates among a first plurality of open states, including: rotation of the orifice plate in a first direction with respect to the center point effects an equal incremental increase per degree of rotation in an open area of the first equi-incremental phase region and rotation of the orifice plate in a second direction, the second direction opposite the first direction, effects an equal incremental decrease per degree of rotation in the open area of the first equi-incremental phase region.

The first aperture may further include a semi-circular section extending from the first equi-incremental phase region. The first aperture may further include a second equi-incremental phase region extending from the first equi-incremental phase region. The second equi-incremental phase region may define an opening including: a first arc boundary having a first arc center point that is shared with the center point of the orifice plate and a first arc radius; a second arc boundary having a second arc center point that is shared with the center point of the orifice plate and a second arc radius, the second arc radius being greater than the first arc radius. The first aperture may include chamfered edges.

The orifice plate may further include a second aperture, the second aperture having a configuration that is equal to the first aperture. Rotation of the orifice plate may effects a corresponding simultaneous opening or closing of both of the first aperture and the second aperture. The first aperture and the second aperture may be disposed 180 degrees apart from one another.

The choke valve may further include: a guide vane disposed in the valve body upstream of the orifice plate, the guide vane comprising at least one vane aperture to direct the flow of fluid into the first aperture. The guide vane may include: a first vane aperture and a second vane aperture, the first vane aperture being disposed 180 degrees apart from one another to the second vane aperture. The first vane aperture and the second vane aperture may together define a guide space. The at least one aperture may define a maximum open aperture space, and the guide space may be greater than the maximum open aperture space. Each of the first vane aperture and the second vane aperture may be generally kidney shaped; and the guide space may taper from an inlet side defining a first inner area to an outlet side defining a second inner area, the second inner area being less than the first inner area.

A method of flowing a fluid through a choke valve may include: flowing the fluid into a valve body of the choke valve; focusing the fluid to flow into an orifice plate aperture of an orifice plate disposed in the valve body, the orifice plate defining a face, the orifice plate aperture extending through the face; flowing the fluid out of the valve body downstream of the at least one orifice plate aperture; and rotating the orifice plate to adjust opening and closing of the orifice plate to control a rate of flow of the fluid, rotation of the orifice plate in a first direction effecting an equal increment opening of the orifice plate aperture and rotation of the orifice plate in a second direction that is opposite the first direction effecting an equal increment closing the orifice plate aperture. The valve body may define an internal cavity, and the orifice plate controls a flow of fluid through the choke valve, the orifice plate being disposed within the internal cavity of the valve body. The orifice plate may include: a center point and being rotatable about a center axis extending longitudinally through the center point; and a first aperture extending through a face of the orifice plate, the first aperture defining a first equi-incremental phase region, the first aperture being spaced away from the center point of the orifice plate. Rotating the orifice plate with respect to the center point to effect transitioning of the orifice plates among a plurality of open states, including: rotation of the orifice plate in a first direction with respect to the center point effects an equal incremental increase per degree of rotation in an open area of the first equi-incremental phase region; and rotation of the orifice plate in a second direction, the second direction opposite the first direction, effects an equal incremental decrease per degree of rotation in the open area of the first equi-incremental phase region.

These and other aspects of the present disclosure are described in greater detail below with reference to the accompanying figures.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4A is a cutaway, perspective view of the choke valve of FIG. 1 including the orifice plate of FIG. 2A coupled to a gear and disposed adjacent to a trim plate.

FIG. 4B is a partially cutaway view of the orifice plate of FIGS. 2A-2B.

FIG. 4C is a perspective view of the gear of FIG. 4A shown coupled to the orifice plate 115 of FIGS. 2A-2B and shown relative to the trim plate of FIG. 4A.

DETAILED DESCRIPTION

Figure 1:
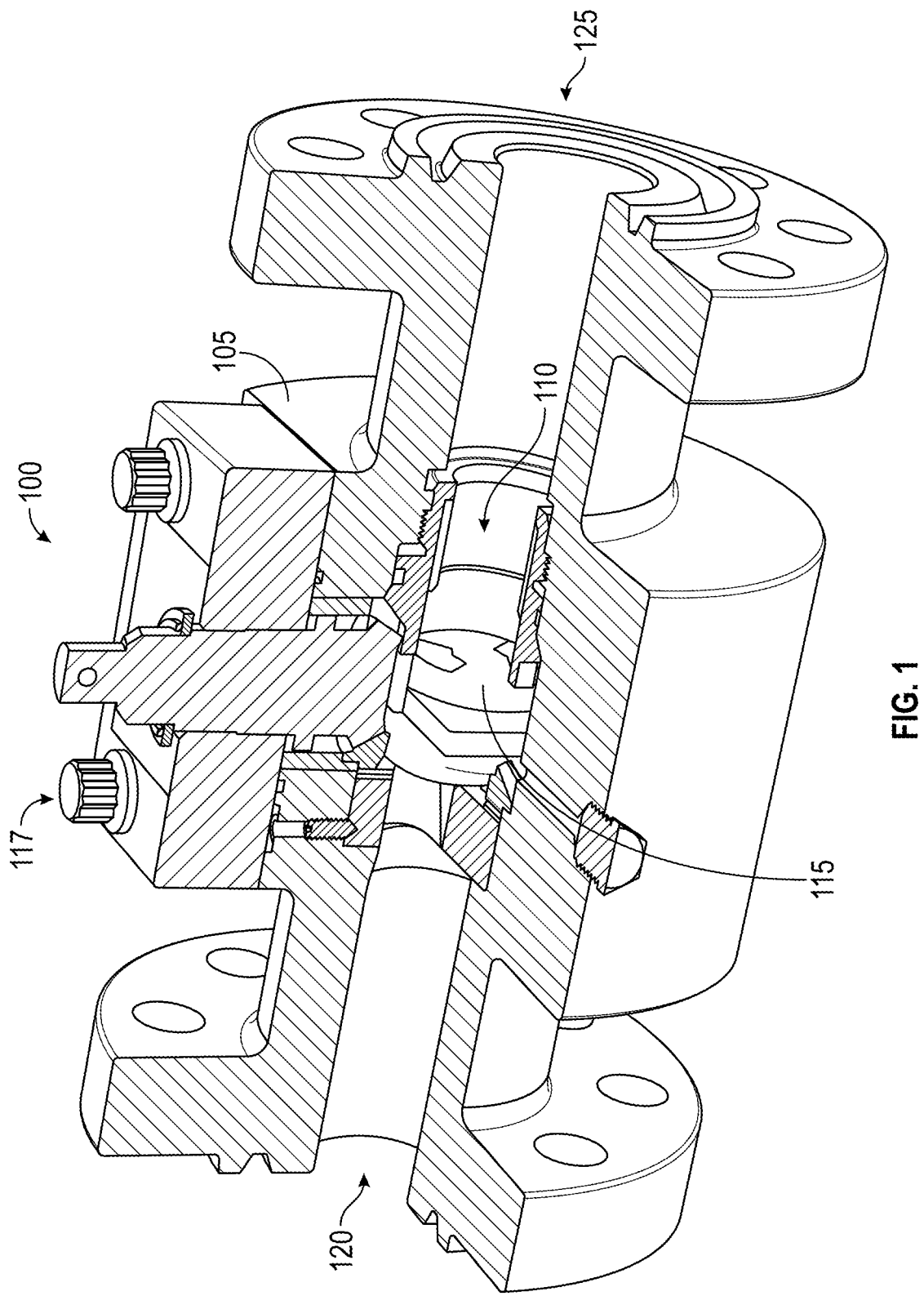
FIG. 1 is cutaway, perspective view of a choke valve according to an embodiment of the present disclosure.

Reference will now be made in detail to embodiments of the present disclosure. Wherever possible, same or similar reference numerals are used in the drawings and the description to refer to the same or like parts or steps. The drawings are in simplified form and are not drawn to precise scale. The word 'couple' and similar terms do not necessarily denote direct and immediate connections, but also include connections through intermediate elements or devices. For purposes of convenience and clarity only, direction (up/down, etc.) or motional (forward/back, etc.) terms may be used with respect to the drawings. These and similar directional terms should not be construed to limit the scope of the present disclosure. It will also be understood that other embodiments may be utilized without departing from the scope and spirit of the present disclosure, and that the detailed description is not to be taken in a limiting sense but merely as examples of the preferred embodiments. It will be understood that the provision of the examples described herein, as well as clauses prefaced with "such as," "e.g.", "including", "in some aspects," "in some implementations," and the like should not be interpreted as limiting the disclosed subject matter to the specific examples.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As briefly discussed above, choke valves include wearable internal components and features that may experience, for example, erosion, due to the properties of fluids flowing therethrough. Fluid properties may include, among other aspects, flow rate and the presence of particulates, such as sand and other production components, entrained within the fluids. The wearable components include orifice plates, which may also be referred to as orifice disks, located within a valve body. Orifice plates may be designed to be adjustable, thereby allowing a flow rate and pressure drop in the fluid line and through the valve body to be optimized for a particular operation and/or operational situation by, for example, controlling the size of an aperture of an aperture plate as described herein through which fluid flows.

Orifice plates typically include one or more apertures through which fluids flow. Over time, the geometry and/or integrity of the apertures may change due to, for example, erosion. When orifice plates are worn beyond a functional threshold, the orifice plates may require replacement in order for the choke valve to function as intended. As orifice plate replacement may be expensive and time consuming, orifice plates designed to experience less wear may result in operational monetary savings.

Additionally, modifications to the valve body and/or the use of additional components to change the flow characteristics through the valve body and the orifice plates may also be optimized provide favorable flow characteristics. By providing modified flow characteristics, wear of orifice plates may be decreased, thereby resulting in longer lasting orifice plates and/or choke valve components. Embodiments of the present disclosure, which are discussed in detail below, may thereby provide optimized orifice plate and choke valve designs in which, for example, the rate of flow may be adjusted in a controlled, incremental manner.

Referring to FIG. 1, a cutaway, perspective view of a choke valve 100 according to an embodiment of the present disclosure is shown. The choke valve 100 includes a valve body 105 that defines an internal cavity 110 through which fluids (e.g., hydrocarbons such as oil and/or natural gas) may flow. A rotatable valve rotatable valve stem 117 may adjust the rate of fluid flow through the choke valve 100 by rotating an orifice plate 115 as described more fully below. An actuator (e.g., a handwheel; not shown in the drawings) may be coupled to the rotatable valve rotatable valve stem 117 to facilitate rotation of the rotatable valve stem 117. During operation, fluids may flow through the internal cavity 110 from an inlet 120 to an outlet 125 to exit the choke valve 100. Fluid flow through the orifice plate 115 may result in flow rate and pressure changes of the fluid flowing though the choke valve 100. The choke valve 100 may be adjusted to control the flow rate and/or pressure by rotating the orifice plate 115 for certain operations or operational conditions.

Figure 2A:
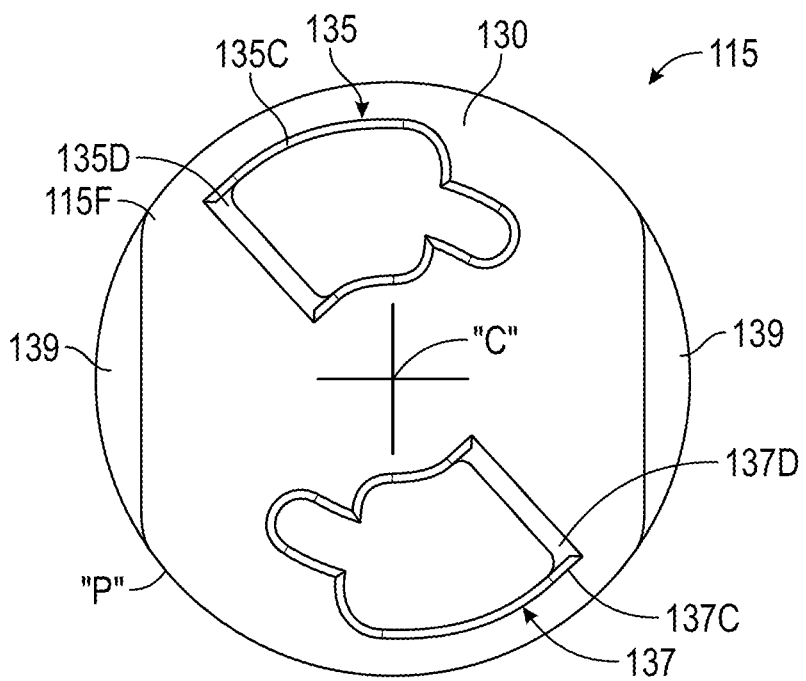
FIG. 2A is an elevation, end view of an orifice plate, according to an embodiment of the present disclosure.
Figure 2B:
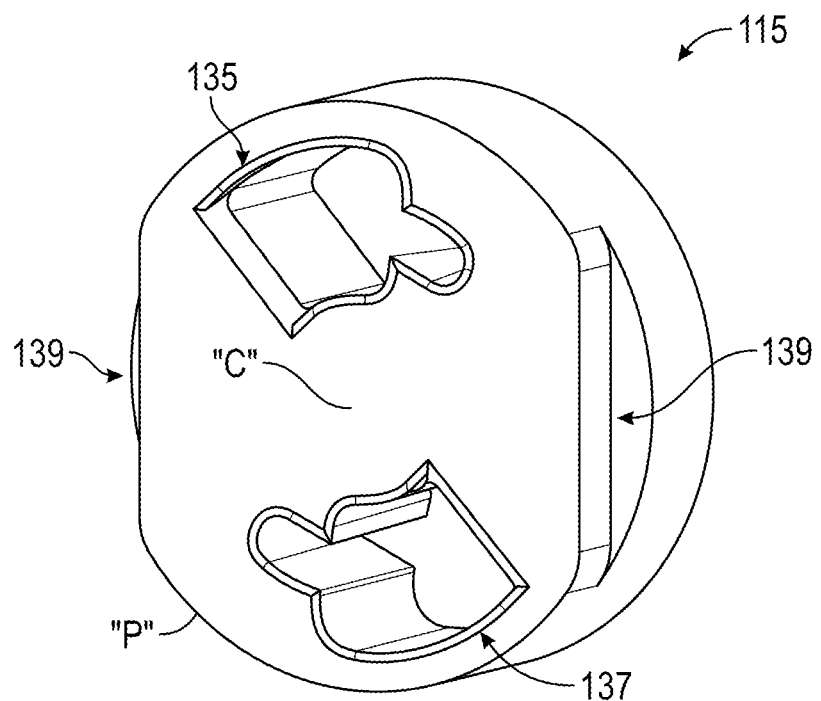
FIG. 2B is a perspective view of the orifice plate of FIGS. 2A-2B.

As shown best in FIGS. 2A-2B, the orifice plate 115 may include a plate body 130. The plate body 130 may be formed of a unitary construction and from any suitable material, which may include hardened and/or erosion resistant properties. Such materials may include for example, a variety of metals (e.g., hardened steel), metal alloys (e.g., tungsten alloys), metal compounds (e.g., tungsten carbide), composites, and/or the like. The orifice plate 115 may include at least one aperture that extends through a face 115F of the orifice plate 115. The at least one aperture may include a first aperture 135 and a second aperture 137. The first aperture 135 and the second aperture 137 may be disposed 180 degrees apart from one another with respect to a center point "C" of the face 115F and spaced apart from a perimeter or circumference of the face 115F. The orifice plate 115 may include notches or grooves 139 formed diametrically opposing sides of the perimeter or circumference of the plate 115. The notches or grooves 139 may engage corresponding grooves of a gear 140 for effecting rotation of the orifice plate 115 within the internal cavity 110 of the valve body 105.

Figures 3A, 3B:
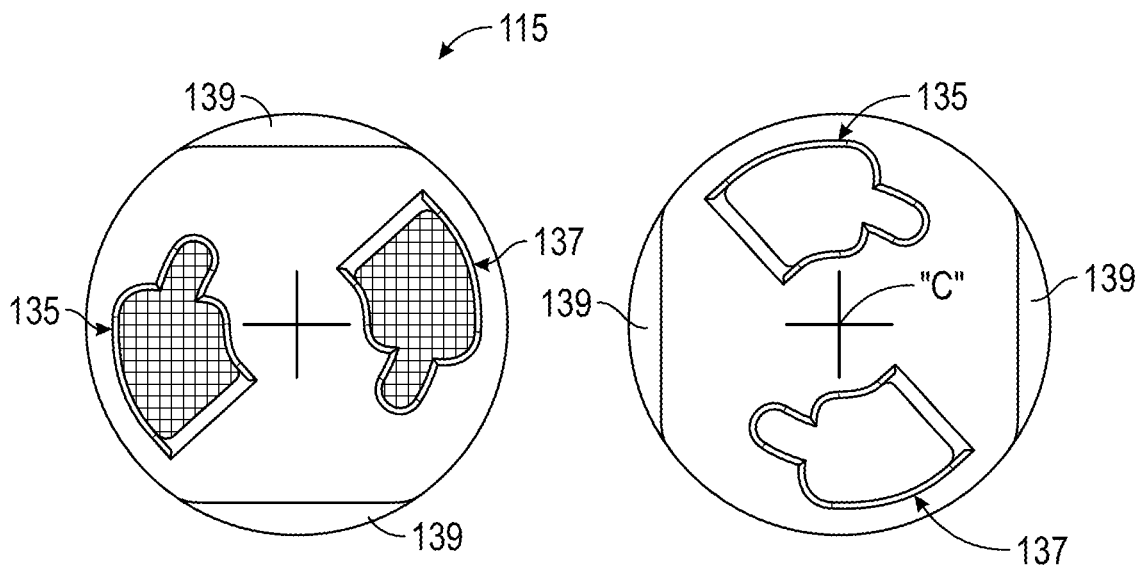
FIGS. 3A-3D illustrate the orifice plate of FIGS. 2A-2B in various open and closed states.

As shown in FIGS. 3A-3D, various states of the orifice plate 115 are shown. FIG. 3A illustrates a closed state of the orifice plate 115 in which the first aperture 135 and the second aperture 137 are shown as being entirely obstructed. FIG. 3B illustrates the first aperture 135 and the second aperture 137 as being entirely open. Transitioning of the orifice plate 115 from the closed state (FIG. 3A) to the entirely or maximally open state (FIG. 3B) may be effected by rotated the orifice plate, for example, by 90 degrees with respect to the center point "C" of the orifice plate 115 and spaced apart from the perimeter or circumference "P" of the orifice plate 115. The first aperture 135 and the second aperture 137 may have the same shape and configuration and may be disposed 180 degrees apart from one another such that rotation of the orifice plate 115 effects a corresponding opening or closing of both of the apertures 135, 137 depending upon the direction of rotation with respect to the center point "C" of the orifice plate 115. The first aperture 135 may include a first section 135A and a second section 135B. The second aperture 137 may include a first section 137A and a second section 137B. The edges 135C and 135D of the first aperture 135 may be chamfered and/or rounded to inhibit stress concentrations. Similarly, the edges 137C and 137D may also be chamfered and/or rounded to inhibit stress concentrations.

Figures 3C, 3D:
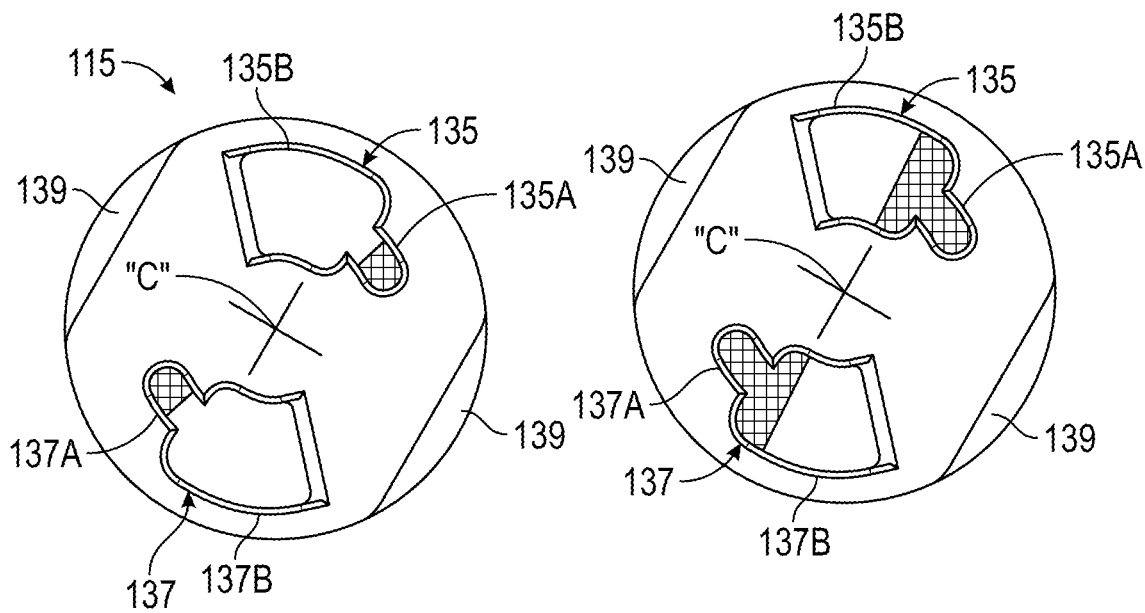

As shown in FIG. 3C, the first sections 135A and 137A are each partially obstructed and the second sections 135B and 137B are entirely open. As shown in FIG. 3D, the first sections 135A and 137A are both entirely obstructed and the second sections 135B and 137B are both partially obstructed. Preferably, during an opening operation, the orifice plate 115 is rotated such that the opening of the first sections 135A and 137A occur prior to the opening of the second sections 135B and 137B. In particular, the orifice plate 115 may be operably coupled to a gear 140 which may be operably coupled to the rotatable valve stem 117 such that rotation of the rotatable valve stem 117 may effect a corresponding rotation of the gear 140 in which the orifice plate 115 is disposed such that the orifice plate 115 rotates as the gear rotates. The first sections 135A and 137A may each define a smaller space than the spaces defined within the second sections 135B and 137B such that the opening of the flow occurs more slowly when the first sections 135A and 137B as compared to when the opening of the second sections 135B and 137B occurs.

Figure 3E:
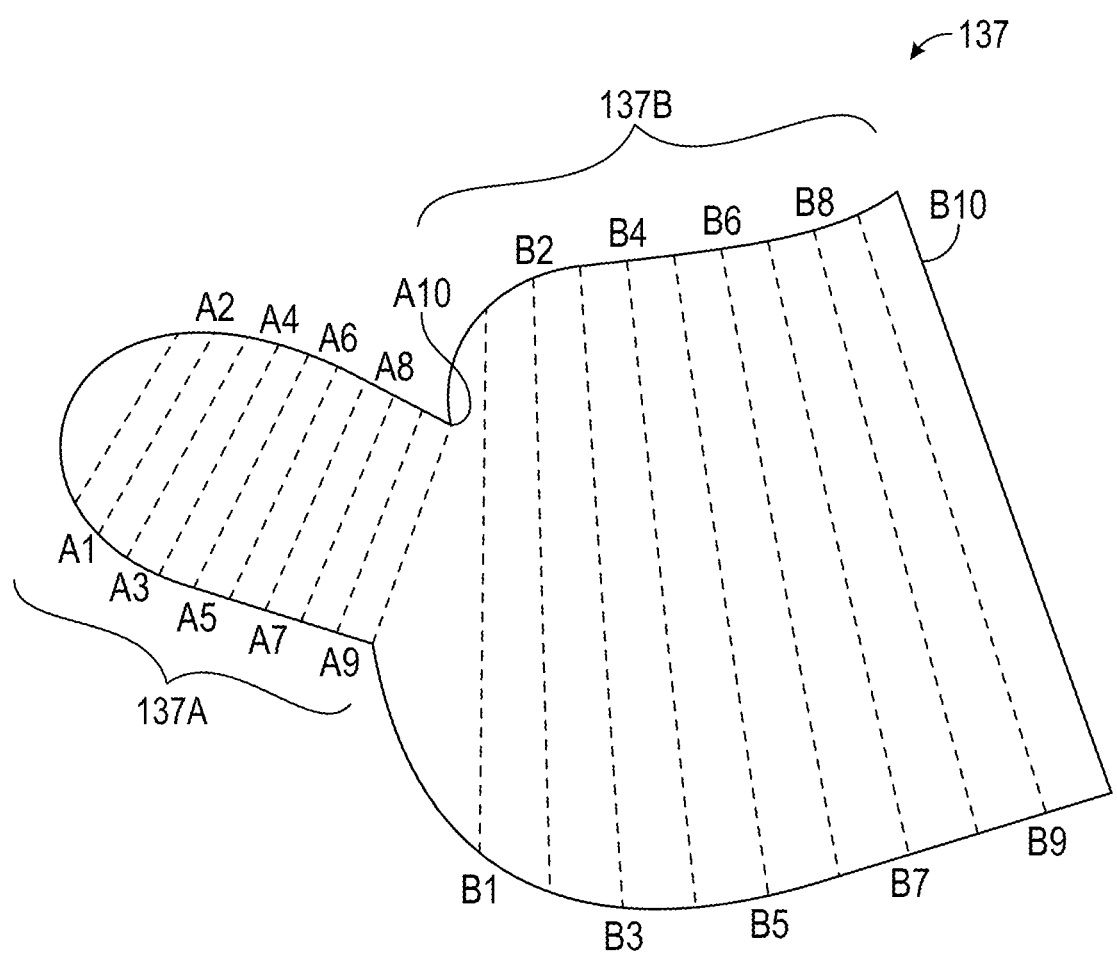
FIG. 3E illustrates zones of one of the apertures of the orifice plate of FIGS. 2A-2B.

Preferably, each degree rotation of the orifice plate 115 effects an incremental and/or staged opening of the apertures 135 and 137 when the orifice plate 115 is rotated in a first direction with respect to the center point "C", and similarly, an incremental and/or staged closing when rotated in a second direction that is opposite the first direction. As shown in FIG. 3E, the second aperture 137 is shown in which the first section 137A is divided into ten (10) incremental zones defined by successive phantom lines A1-A10 and the second section 137B is divided into ten (10) incremental zones B1-B10. Each of the zones A1-A10 and B1-B10 may represent an equal increment of rotation of the orifice plate 115. The first section 137A may be referred to herein as a first equi-incremental section and the second section 137B may be referred to herein as a second equi-incremental section. The first aperture 135 may have the same configuration as the second aperture 137.

As described before, a 90-degree rotation of the orifice plate 115 may effect transitioning of the apertures 135 and 137 from a closed state (FIG. 3A) to an open state (FIG. 3B). Accordingly, the twenty zones A1-B10 that are identified in phantom line in FIG. 3E may each correspond to 90 degrees divided by twenty (20) or 4.5 degrees of rotation. For example, each 4.5 degree rotation of the orifice plate 115 may effect transitioning opening of the first aperture to open a succession of the zones defined by the increments A1-B10. Preferably, each of the zones defined by the phantom lines A1-B10 may effect the same incremental opening of the respective section 137A and 137B. It is noted that sections AI and BI may be marginally smaller than the remaining zones. This is because the ends of the sections AI and BI may include rounded shoulders 137S to minimize stress concentrations. Similarly, the edges of the apertures 135 and 137 may each include chamfered or rounded edges.

Figure 4D:
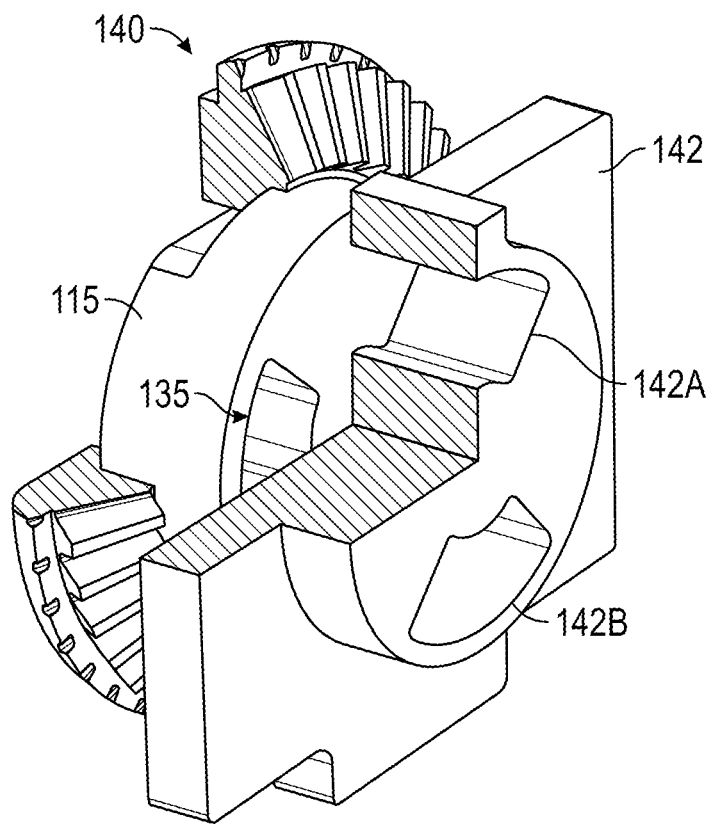
FIG. 4D is a cutaway, perspective view of the coupled gear and orifice plate as shown in FIG. 4C shown relative to the trim plate of FIG. 4A and shown in a closed state.
Figure 4E:
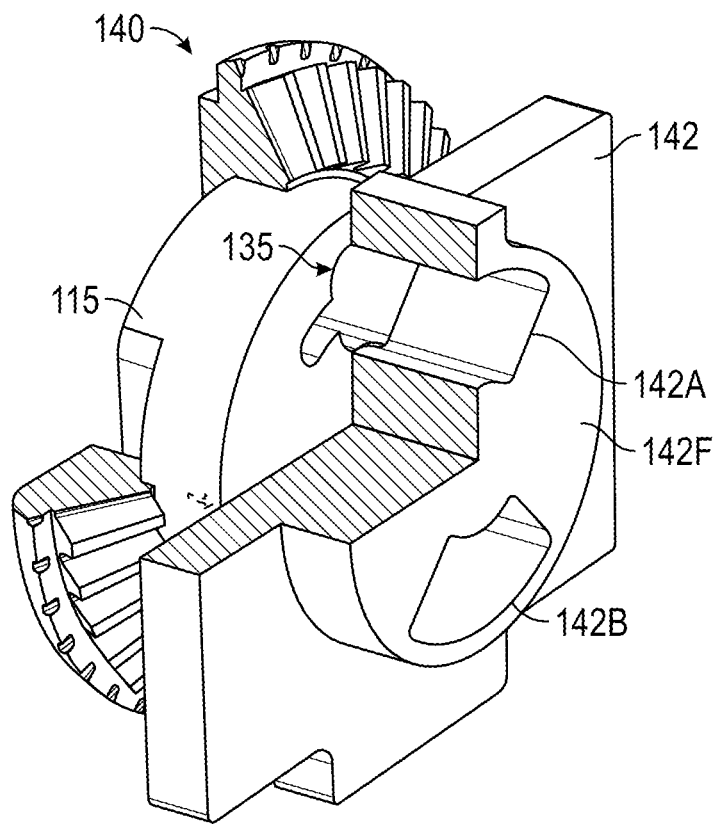
FIG. 4E is a cutaway, perspective view of the coupled gear and orifice plate as shown in FIG. 4C shown relative to the trim plate of FIG. 4A and shown in an open state.

FIG. 4A is a cutaway, perspective view of the choke valve of FIG. 1 including the orifice plate of FIG. 2A coupled to the gear 140 and disposed adjacent to a trim plate 142 within the choke valve 100. The trim plate 142 may be disposed within the valve body downstream of the orifice plate 115. Unlike the orifice plate 115, which is rotatable, the trim plate 142 may be in a stationary position. The rotation of the orifice plate 115 relative to the trim plate 142, which is stationary, may cause the apertures 135 and 137 of the orifice plate 115 to transition between a closed state in which the apertures 135 and 137 are obstructed and a plurality of open states in which the apertures 135 and 137 are a percentage open (e.g., partially open or fully open). As shown in FIG. 4B, the gear 140 is configured to receive the orifice plate 115 in a notch and groove relationship. The orifice plate 115 may be frictionally secured or coupled to the gear 140. As shown in FIG. 4C, a trim plate 142 may be disposed within the valve body of the choke valve 100 at a downstream relative position (i.e., closer to the outlet 125). The trim plate 142 may include a face 142F that includes apertures 142A and 142B. As shown in FIG. 4D, the orifice plate 115 is in a closed position as the face 142F of the trim plate 142 obstructs the apertures 135 and 137 of the orifice plate 115. In contrast, as shown in FIG. 4E, the apertures 142A and 142B are aligned with respective apertures 135 and 137 such that both of the apertures 135 and 137 are open. A plurality of intermediate states, i.e., partially open states, of the apertures 135 and 137 may be realized by rotating of the orifice plate 115 relative to the stationary trim plate 142 such that a desired percentage or desired sections of the apertures 135 and 137 are either open or closed.

Figure 5:
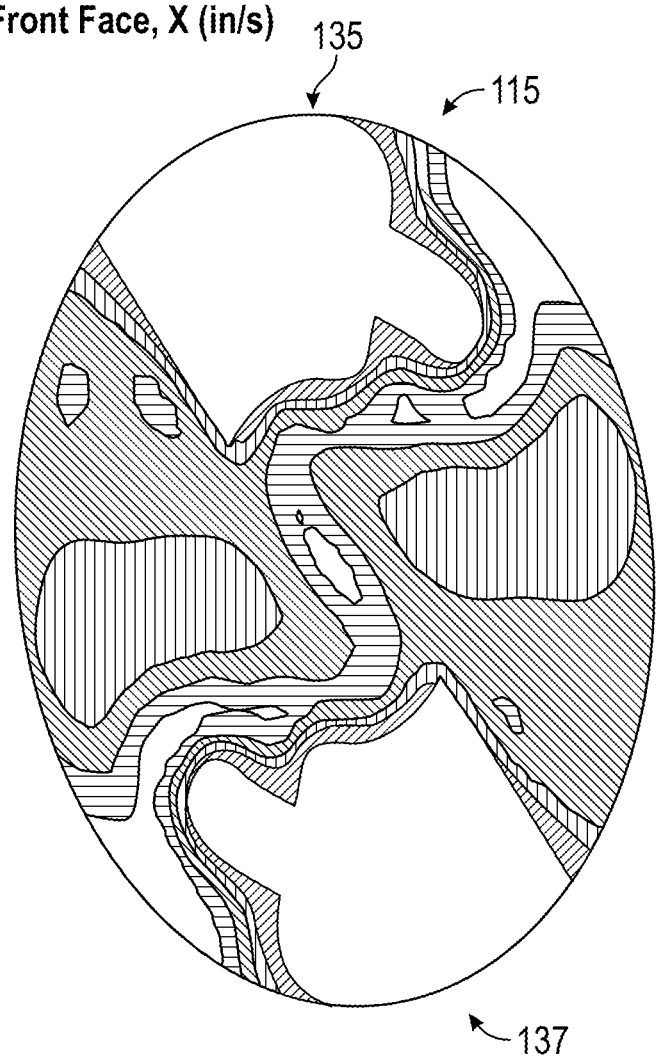
FIG. 5 depicts a simulated fluid flow through the orifice plate of FIGS. 2A-2B.

FIG. 5 illustrates a computer-generated model using computational fluid dynamics for the orifice plate 115 according to one or more embodiments of the present disclosure is shown. In this embodiment, the orifice plate 115 of FIG. 2 has been computer simulated using computational fluid dynamics to determine potential erosion rates based on the orifice plate 115 geometric profile discussed above. For example, conditions for the computational fluid dynamics assume water as a working fluid flowing at a temperature of 150 degrees Fahrenheit. The fluid is flowed at an inlet volume flow rate of 100 gallons/minute and has an exit outlet pressure of 3000 pounds/square inch. FIG. 5 illustrates the fluid surface velocity at a face of the orifice plate 115, where each pattern region represent a different range of velocity values. In areas where the velocity is greater, greater erosion on the face of the orifice plate 115 can be expected. In contrast, in areas of lesser velocities, lesser erosion on the face of the orifice plate 115 can be expected.

Figure 6:
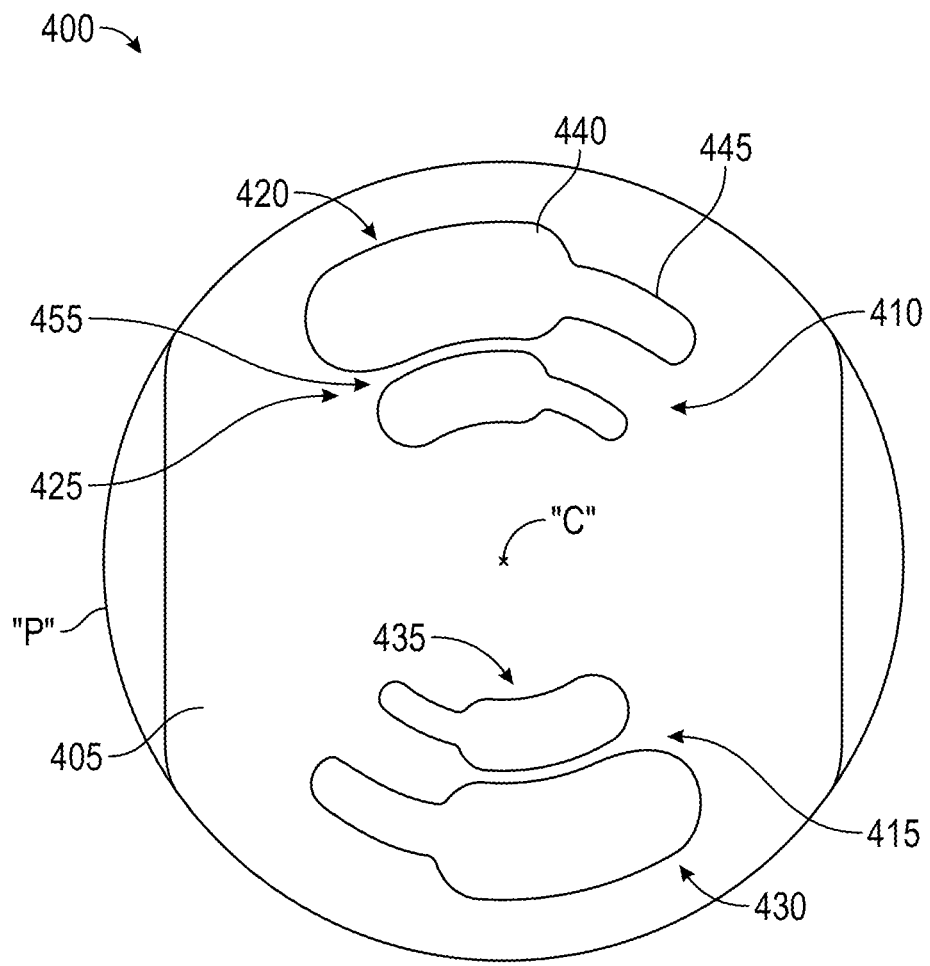
FIG. 6 is an elevation, end view of an orifice plate according to another embodiment of the present disclosure.

Referring to FIG. 6, an end view of an orifice plate 400 according to one or more embodiments of the present disclosure is shown. The orifice plate 400 differs from the orifice plate 115 in the number and arrangement of the apertures that are defined within the orifice plate 400. The orifice plate 400 is configured to also provide an incremental and staged opening or closing of the valve. In this embodiment, orifice plate 400 includes a plate body 405. Plate body 405 may be formed from various metals, metal alloys, composites, and the like. Orifice plate 400 also includes a first aperture pair 410 and a second aperture pair 415 formed through plate body 405. First aperture pair 410 and second aperture pair 415 each include two non-connected respective apertures 420/425 and 430/435, respectively. Each of the two non-connected respective apertures 420/425 and 430/435 include asymmetrical geometric profiles. Note that, in this embodiment, the asymmetric geometric profiles are another example of an irregular geometry. Each of the apertures 420/425 and 430/435 may have the same shape and configuration of the apertures 135 and 137.

For the sake of clarity and so as not to obscure that which is claimed below, only the geometry of first aperture pair 410 is discussed in detail. Those of ordinary skill in the art having the benefit of this disclosure will appreciate that second aperture pair 415 may include a similar or same geometric profile as first aperture pair 410. First aperture 420 of first aperture pair 410 includes a main body 440 that is oblong. A radiused notch 445 extends from main body 440. Second aperture 425 of first aperture pair 410 includes a substantially similar geometric profile to first aperture 420. However, second aperture 425 is longitudinally and latitudinally shorter than first aperture 420. Additionally, second aperture 425 is located radially closer to a center "C" of orifice plate 400 than first aperture 420. First aperture 420 is separated from second aperture 425 through a divider portion 455 that includes a substantially continuous portions of plate body 405.

Orifice plate 400 may define a circular shape. In other embodiments, however, the perimeter "P" of the orifice plate 400 may be oblong, rectangular, square, irregularly radiused, or of differing geometries to match a disposal location within a choke valve. The other orifice plates (e.g., orifice plate 115 and orifice plate 500 (FIG. 7) may also have such configurations. For example, the gear 140 may be circular and rotatable, and may be configured to receive the orifice plate 115, 400, or 500 within a corresponding recess such that when the orifice plate is coupled to the gear, the assembly of the gear and the orifice plate are rotatable. Those of ordinary skill in the art having the benefit of this disclosure will appreciate the diameter of orifice plate 400, as well as a thickness of orifice plate 400 may vary according to the type of choke valve in which orifice plate 400 is disposed.

Figure 7:
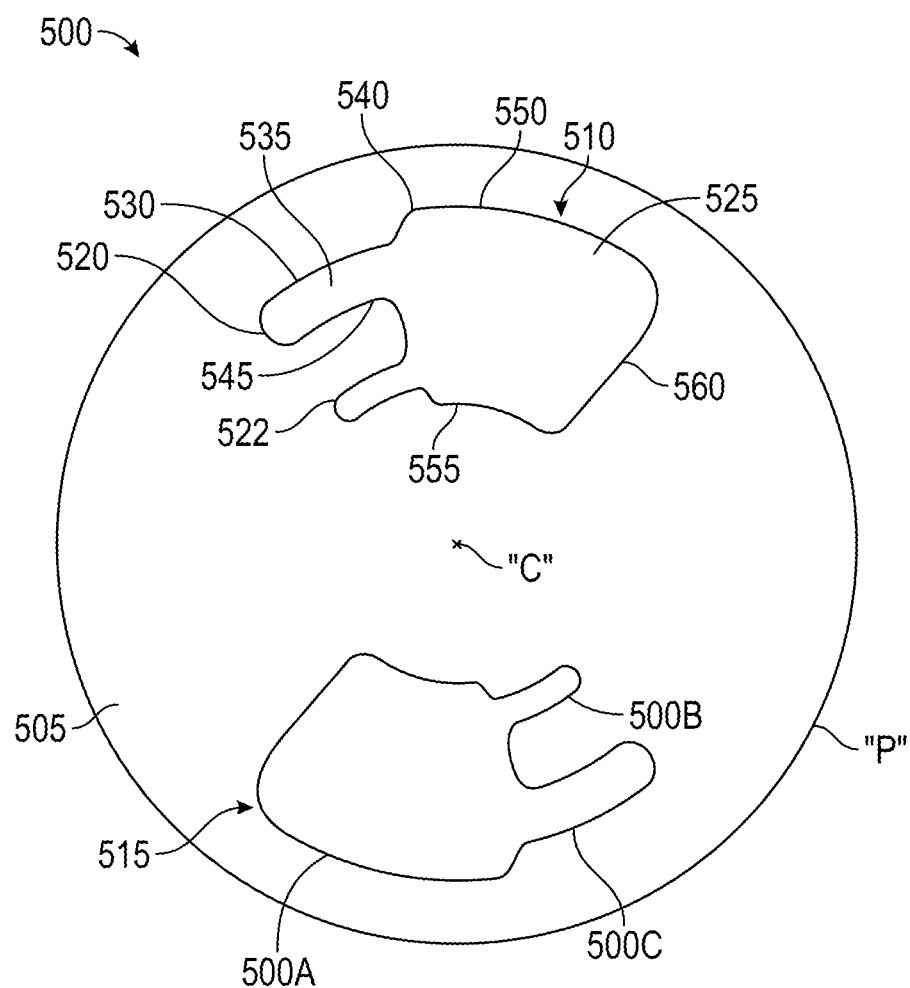
FIG. 7 is an elevation, end view of an orifice plate according to another embodiment of the present disclosure.

Referring to FIG. 7, an end view of an orifice plate 500 according to one or more embodiments of the present disclosure is shown that is also configured to provide an incremental and staged opening of the valve. In this embodiment, orifice plate 500 includes a plate body 505. Plate body 505 may be formed from various metals, metal alloys, composites, and the like. Orifice plate 500 also includes a first aperture 510 and a second aperture 515 formed through plate body 505. First aperture 510 and second aperture 515 may each have an irregular geometry. In particular, the irregular geometries of first aperture 510 and second aperture 515 refers to the shape of the apertures including asymmetrical geometric profile. More particularly, each of the apertures 510 and 515 may include a first section 500A that is similar to the shape and configuration of the second section 135B of the first aperture 135 previously described. Each aperture 510 and 515 may further include a second section 500B and a third section 500C that is similar in shape and configuration of the first section 135A of the aperture 135B.

In this embodiment, orifice plate 500 has a first aperture 510 including two radiused notches 520/522 that extends from first main body 525. For the sake of clarity, only the geometry of first aperture 510 is discussed in detail. Those of ordinary skill in the art having the benefit of this disclosure will appreciate that second aperture 515 may include a similar or same geometric profile as first aperture 510. In first aperture 515, a first radiused notch 520 includes two substantially linear sides 530/535 that connect radiused notch 520 to two respective radiused shoulders 540/545. In certain embodiments, first edge 550 is longer than second edge 555, thereby resulting in first main body 525 having an incomplete triangular geometric profile.

Second notch 522 is located radially closer to a center "C" of orifice plate 500. Second notch 522 includes a geometric profile similar or equivalent to that of first radiused notch 520, however may have a net area that is smaller than second notch 522. For example, in certain embodiments, the net area of second notch 522 may be 5% or less, 10%, 15%, 20%, 25%, 30%, 35%, 40%, 40% and/or 55% or greater than the net area of first radius notch 520.

Orifice plate 500 may include a perimeter "P" that is circular, i.e., the orifice plate 500 may define a circumference. In other embodiments, an outer edge of orifice plate 500 may be oblong, rectangular, square, irregularly radiused, or of differing geometries to match a disposal location within a choke valve. Those of ordinary skill in the art having the benefit of this disclosure will appreciate the diameter of orifice plate 500, as well as a thickness of orifice plate 500 may vary according to the type of choke valve in which orifice plate 500 is disposed. Additional orifice plate 500 apertures 510/515 will be discussed in detail below.

Figure 8:
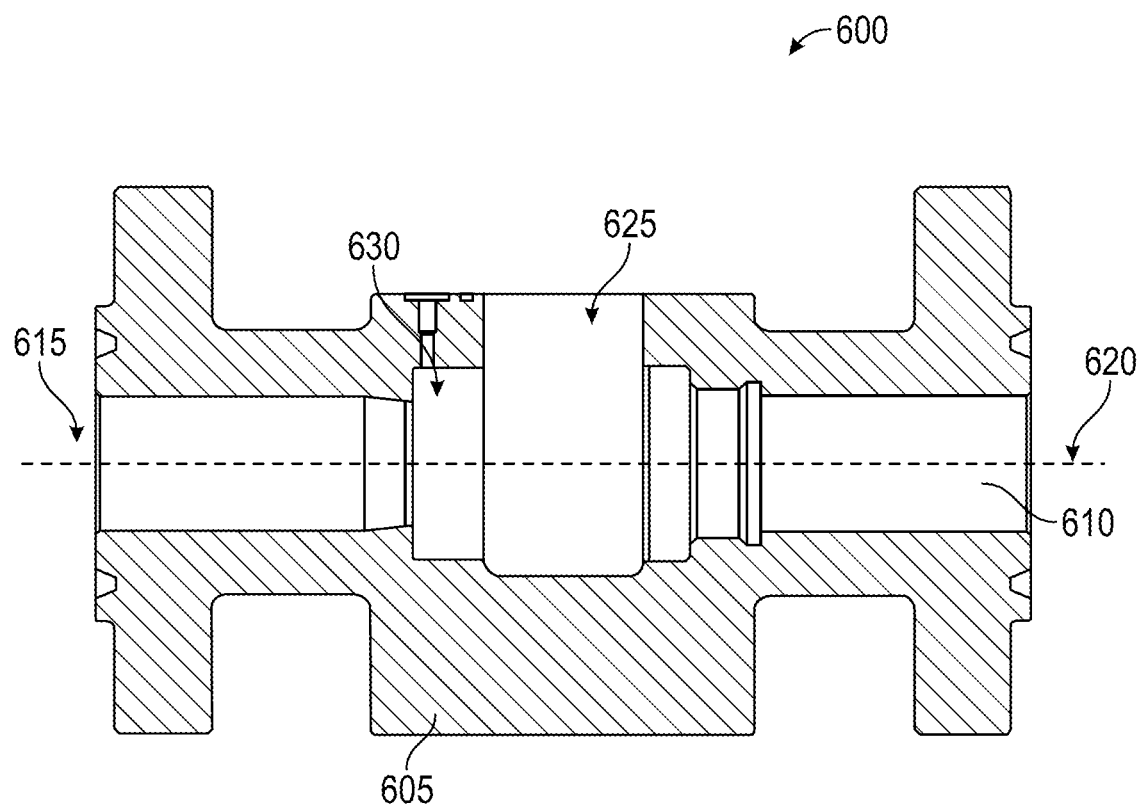
FIG. 8 is a cross-sectional view of a choke valve body according to an embodiment of the present disclosure.

Referring to FIG. 8, a plan, cross-sectional view of a choke valve 600 according to one or more embodiments of the present disclosure is shown. In this embodiment, choke valve 600 includes a valve body 605 including an internal cavity 610. Valve body 605 may further include an inlet 615 through which fluids enter valve body 605, as well as an outlet 620 through which fluids exit valve body.

Choke valve 600 may further include a space 625 to receive an orifice plate, such as those discussed above, e.g. orifice plate 115, 400, 500, defined within internal cavity 610. On the inlet 615 side of valve body, 605, internal cavity 610 may include a smooth reduction shoulder 630 that includes a tapered or radiused edge profile. As the smooth reduction shoulder 630 is located upstream of the orifice plate (e.g., orifice plate 115) that is disposed within the space 625, the smooth reduction shoulder 630 may direct a fluid flowing through internal cavity 610. The term upstream as used herein refers to areas closer to the inlet 615 and the term downstream as used herein refers to areas closer to the outlet 620.

Smooth reduction shoulder 630 may be present in choke valves 600 that include orifice plates (e.g., orifice plate 115) having the geometry discussed above to further decrease erosion or other types of wear that may damage such orifice plates (e.g., orifice plate 115). Alternatively, smooth reduction shoulder 630 may be used with traditional orifice plates, such as cyclonic triangular slot orifice plates. (not shown in the figures). Similarly, smooth reduction shoulder 630 may be used with other design variants for choke valves 600, as are discussed further below.

Figure 9:
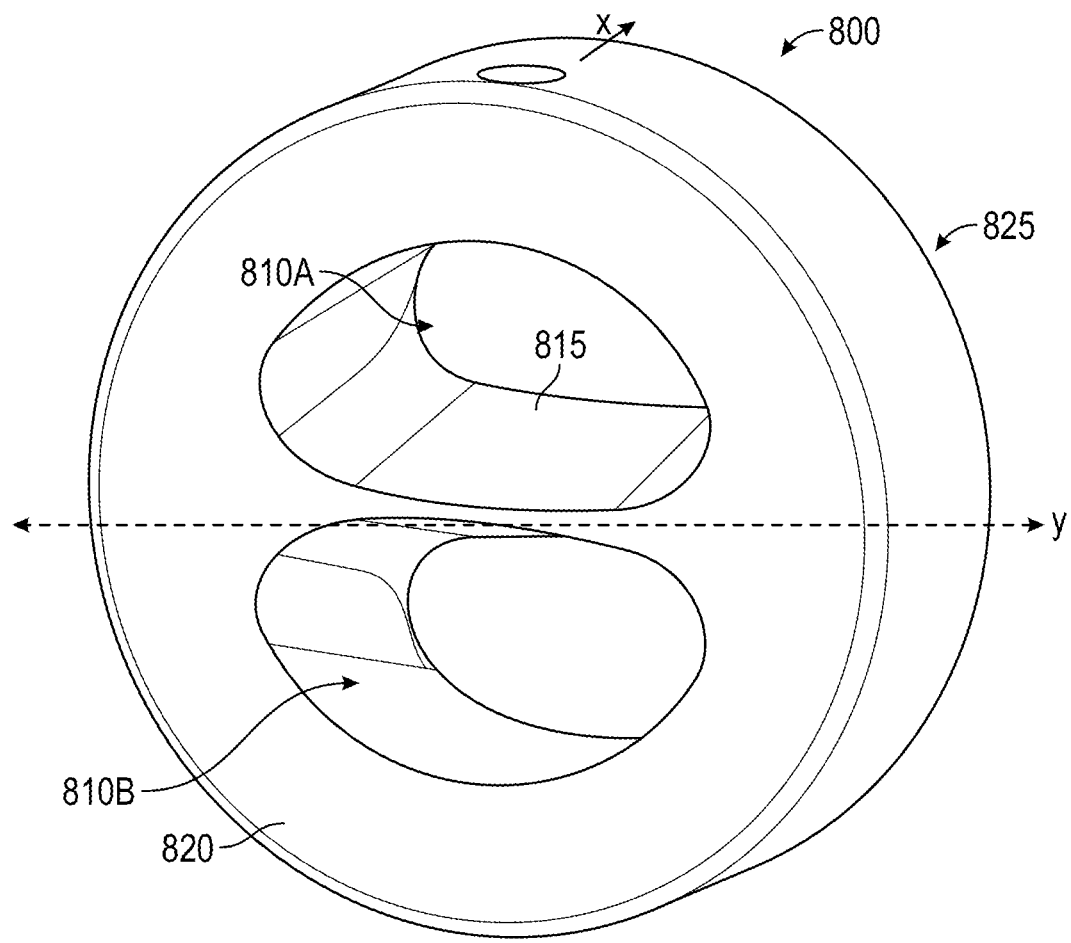
FIG. 9 is a perspective, end view of a guide vane for a choke valve according to an embodiment of the present disclosure.

Referring to FIG. 9, a perspective, end view of a guide vane 800 for a choke valve according to one or more embodiments of the present disclosure is shown. Guide vane 800 may include a solid or substantially solid vane body 805 formed from various metal, metal alloys, composites, and/or the like. Guide vane 800 include a first vane aperture 810A and a second vane aperture 810b. Although shown as including a first vane aperture 810A and a second vane aperture 810B, in other embodiments, the guide vane 800 may include a greater or lesser number of vane apertures. The vane apertures 810A and 810b may be configured to direct a flow of fluids in a choke valve through orifice plates disposed downstream of guide vane 800.

The first and second vane apertures 810A and 810B may be symmetrically disposed with respect to one another about an axis y that extends through the center of an inlet face 820 of the guide vane 800. In other embodiments, guide vane 800 may include a single vane aperture 810, three vane apertures 810, or more than three vane apertures 810. The number and orientation of such vane apertures 810 may be determined based on the geometry of an orifice plate and/or other aspects of the choke valve in which the guide vane 800 is disposed.

In certain embodiments, one or more vane apertures 810 may include an internal area that is greater than an area of a plurality of orifice plate apertures. In still other embodiments, one or more vane apertures 810 may include an area that is greater than at least one of a plurality of orifice plate apertures of a respective one of the orifice plates 115, 400, 500. In this implementation, vane apertures 810 include radiused internal edges 815 that taper that decrease in area from the inlet face 820 to an exit face 825 of guide vane 800. As such, the flow of fluid may be restricted and focused as it flows through guide vane 800. By focusing the flow of fluid, the fluid may pass through guide vane 800 and subsequently through an orifice plate with a desired flow pattern. As the fluid is focused, the fluid may erode or otherwise wear orifice plate at decreased rates. Additionally, as guide vane 800 may be a wearable and relatively less expensive component than an orifice plate, when guide vane 800 wears out, the guide vane 800 may be replaced without having the replace the orifice plate. As such, guide vane 800 may increase the life of orifice plates and decrease the operations cost and upkeep costs associated with choke valves. Other aspects and orientations of guide vane 800 will be discussed further below.

The vane apertures 810 may be generally kidney shaped and may include edges that are generally parallel with respect to one another along an axis y that extends through the center of an inlet face 820. In particular, as shown in FIG. 9, the vane apertures 810A and 810B are referred to as being kidney shaped in the sense that it includes a generally oval shape that is flattened on one side along its length. The vane apertures 810 may taper (i.e., narrow) from the inlet face 820 to the exit face 825 along the direction of flow as indicated by directional arrow X.

Figure 10:
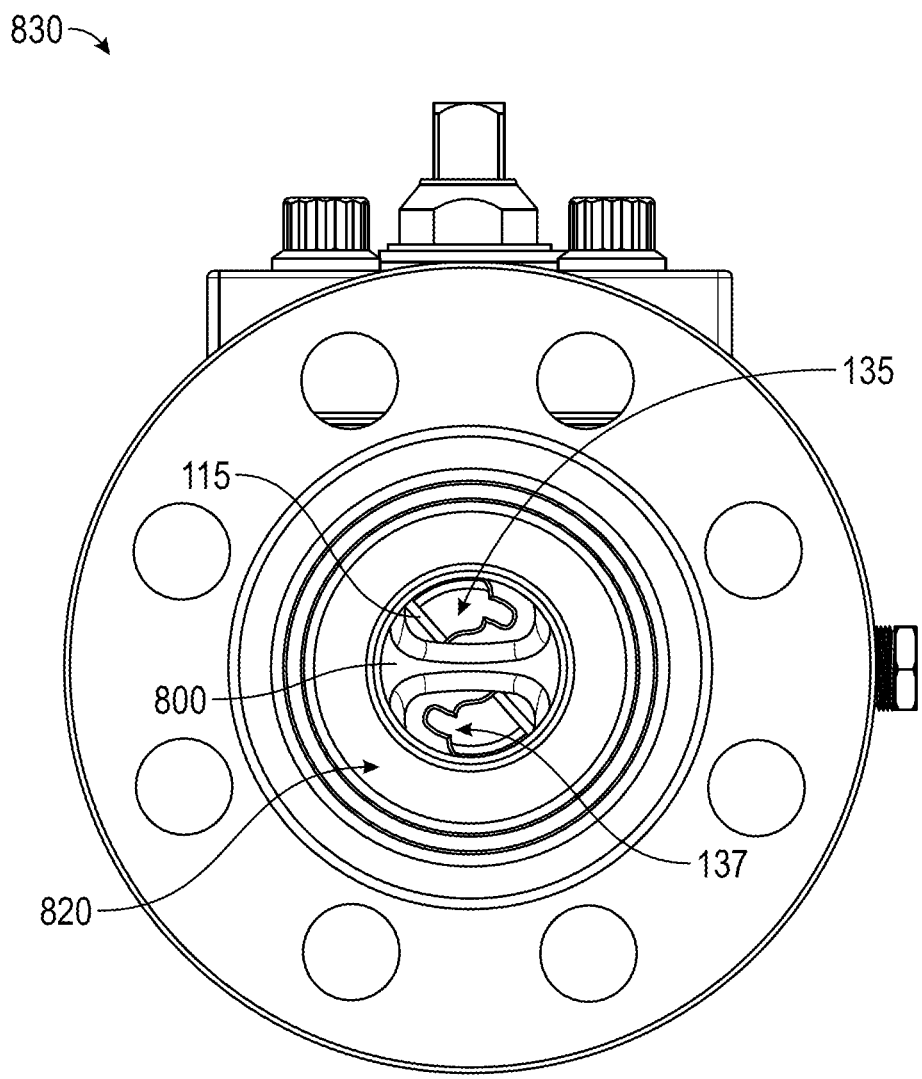
FIG. 10 is an elevation, end view of a choke valve having a guide vane according to an embodiment of the present disclosure.

Referring to FIG. 10, an end view of a choke valve 830 having a guide vane according to one or more embodiments of the present disclosure is shown. The choke valve 830 may be substantially similar to the choke valve 100 except in the ways that are described herein. In this embodiment, a guide vane 800 is illustrated as being disposed within the choke valve 830. As fluid flows into choke valve 830 through inlet face 820, the fluid may first pass through the guide vane 800, and then through an orifice plate 115 (or another of orifice plate (e.g., orifice plate 400, 500)) having corresponding orifice plate apertures 135, 137. As illustrated, orifice plate 115 (or another of orifice plate (e.g., orifice plate 400, 500)) includes two orifice plate apertures 135, 137 that are in fluid communication with the vane apertures when the aperture plate 115 is in the open (or partially open) states. In other embodiments, guide vane 800 may include vane apertures 810 and orifice plate 115 (or another of orifice plate (e.g., orifice plate 400, 500)) may include orifice plate apertures 135 and 137 having different geometries and/or orientation.

Figure 11:
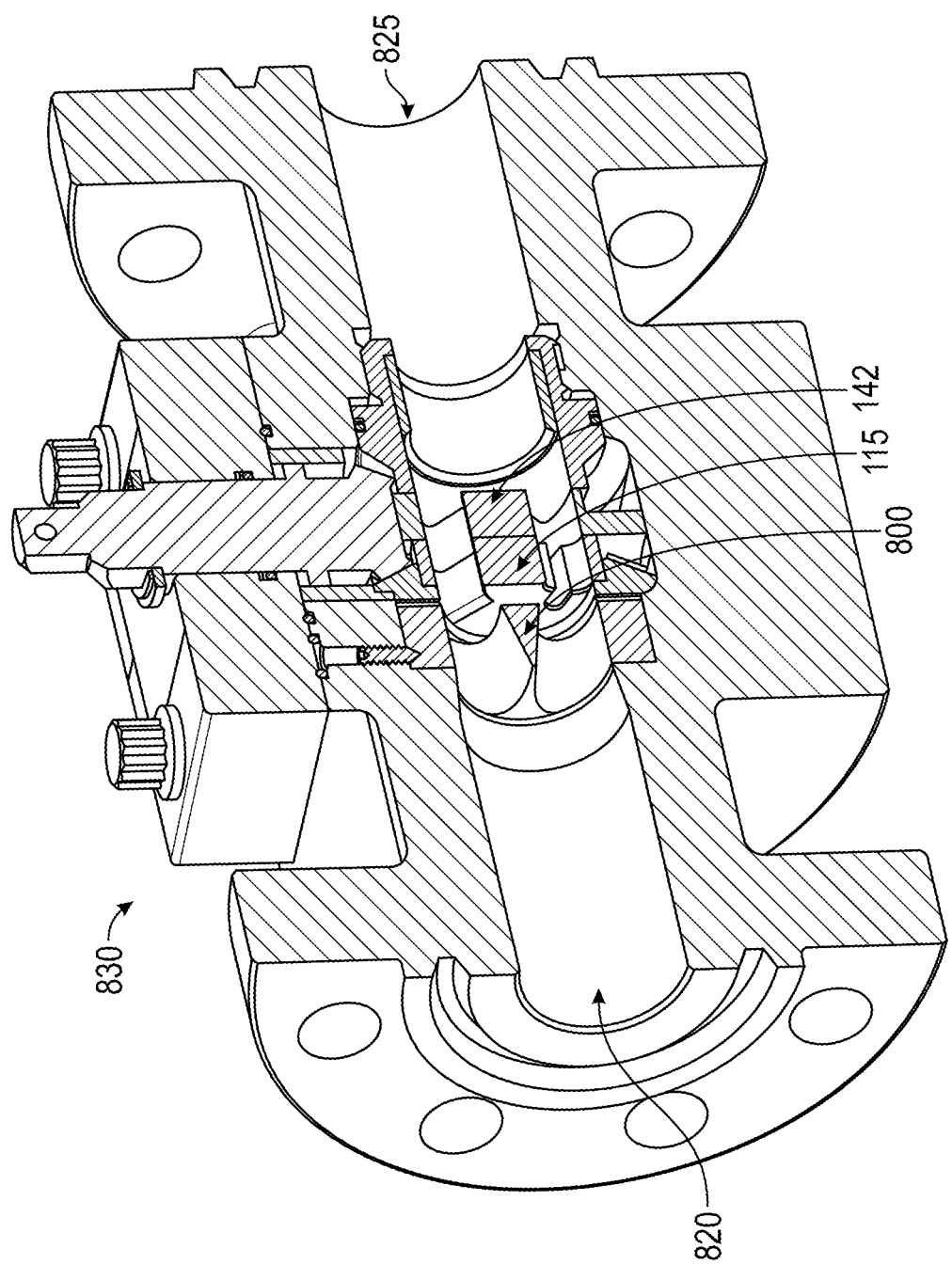
FIG. 11 is a cross-sectional perspective view of a choke valve having a guide vane according to an embodiment of the present disclosure.

Referring to FIG. 11, a cross-sectional, perspective view of a choke valve 830 having a guide vane 800 according to one or more embodiments of the present disclosure is shown. In this embodiment, choke valve 830 includes a guide vane 800 disposed upstream of an orifice plate 115 (or another of orifice plate (e.g., orifice plate 400, 500)). The trim plate 142, which is stationary, may be disposed downstream of the orifice plate 115, as shown in FIG. 11. As used herein, the terms "upstream" and "downstream" are defined relative to the direction of fluid flow through the choke valve. As fluid flows into an inlet face 820, the fluid flows through guide vane 800, is focused through orifice plate 115 (or another of orifice plate (e.g., orifice plate 400, 500)) and exits the choke valve 830 through exit face 825.

Figure 12A:
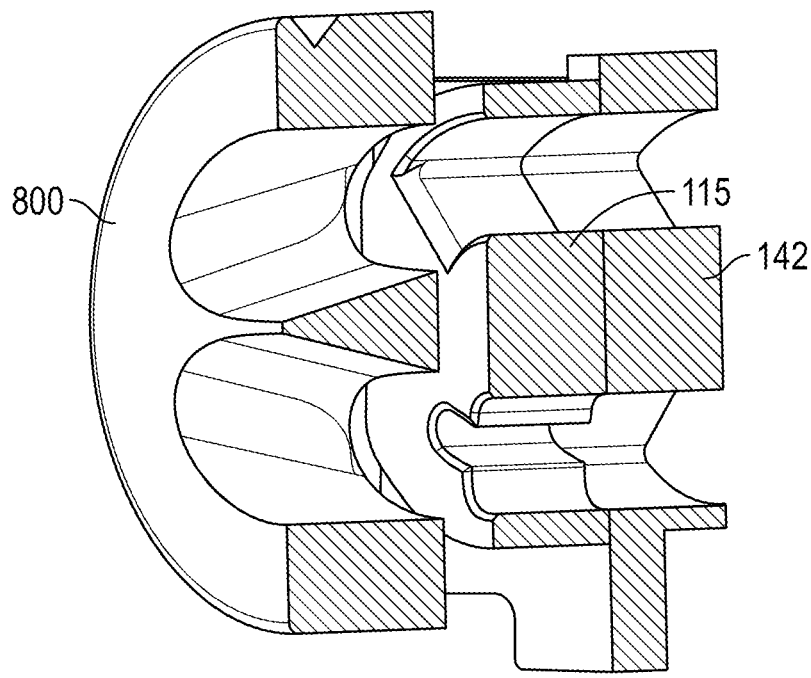
FIG. 12A is a partial cross-sectional view of a choke valve including the guide vane of FIG. 9 and the orifice plate of FIGS. 2A-2B according to an embodiment of the present disclosure.
Figure 12B:
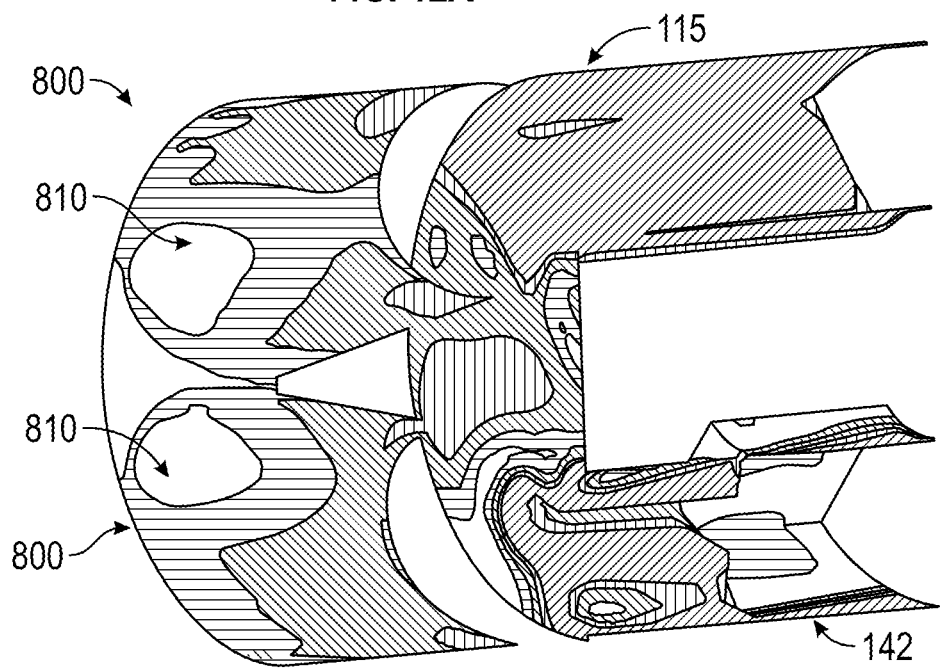
FIG. 12B depicts a simulated fluid flow of on the choke valve as shown in FIG. 12A.
Figure 12B:
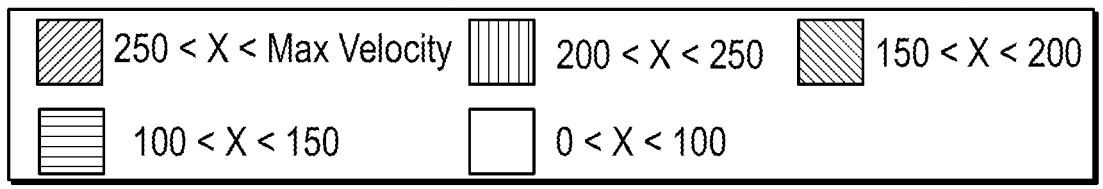

FIG. 12A is a partial cross-sectional view of a choke valve, with parts removed, including the guide vane 800 of FIG. 9 and the orifice plate 115 of FIGS. 2A-2B, as well as the trim plate 142 according to an embodiment of the present disclosure. As discussed, the trim plate 142 may be stationary. The guide vane 800 may also be stationary. The orifice plate 115 is depicted as being disposed or sandwiched between the guide vane 800 and the trim plate 142. The relative rotational movement of the orifice plate 115 with respect to the trim plate 142 effects or causes transitioning of the orifice plate 115 between an open state and an open state, as well as a plurality of intermediate states therebetween. FIG. 12B depicts a simulated fluid flow of on the choke valve as shown in FIG. 12A. For example, conditions for the computational fluid dynamics assume water as a working fluid flowing at a temperature of 150 degrees Fahrenheit. The fluid is flowed at an inlet volume flow rate of 100 gallons/minute and has an exit outlet pressure of 3000 pounds/square inch. FIG. 5 illustrates the fluid surface velocity at a face of the orifice plate 115, where each pattern region represent a different range of velocity values. In areas where the velocity is greater, greater erosion on the face of the orifice plate 115 can be expected. In contrast, in areas of lesser velocities, lesser erosion on the face of the orifice plate 115 can be expected.

A method for flowing a fluid through a choke valve, according to one or more embodiments of the present disclosure, may include flowing the fluid into a valve body of the choke. The fluid may flow into an inlet face of the choke and into an internal cavity that forms a central flow channel within the valve body. As the fluid enters the internal cavity, the fluid may be flowing at a first rate and may include various types of entrained particles and chemicals, as discussed above. In operation, the method may further include directing the fluid into a guide vane disposed in the valve body, the guide vane having at least one vane aperture. The guide vane may be disposed in the internal cavity of the valve body and be located upstream of an orifice plate. As such, as the fluid flows through internal cavity, the fluid may flow into the guide vane prior to flowing through other internal valve components. In certain implementations, prior to flowing into guide vane, the fluid may be focused or otherwise restricted through use of a smooth reduction on an internal circumference of the internal cavity. The smooth reduction may thereby guide the fluid into the guide vane apertures at a desired rate, decreasing contact with solid positions of the guide vane.

In operation, the method may further include focusing the fluid to flow into at least one orifice plate aperture of an orifice plate disposed in the valve body downstream from the guide vane. In certain embodiments, the at least one orifice plate aperture corresponds to the at least one vane aperture. In other embodiments, two or more guide vane apertures may be disposed on guide vane to correspond to two or more orifice apertures. In still other embodiments, the guide vane apertures may not be explicitly designed to correspond to particular orifice apertures. As such, guide vanes may be disposed in existing choke valves, thereby allowing such choke valves to be retrofitted.

In certain implementations, the orifice plate may include a geometry that includes a plurality of sections for a phased incremental opening of the apertures of the orifice plate such as the geometries that have been described above. For example, the apertures of the orifice plates may include a plurality of sections in which rotation of the orifice plate effects an predetermined incremental or a predetermined percentage opening/closing in each of the plurality of sections. Each of the sections may have define a different area or space such that, for example, one of the sections may provide a smaller increment or percent (e.g., finer tuning) than another of the sections in which the increment or percentage is greater. It is preferable that in a staged or phased opening of a valve that the smaller increment section is opened prior to opening the larger increment or percentage section. Such configurations or geometries are described above with respect to the orifice plates 115, 400, 500. For example, such orifice plates may include irregular geometries having at least one arcuate portion, and in certain embodiments, the arcuate portion may include a notch that extends from a main orifice plate aperture. Depending on the desired flow characteristics, the guide vane may also include two or more disposed 180 degrees apart from one another vane apertures. The vane apertures may also include an internal area that is greater than an area of the plurality of orifice plate apertures. Similarly, in certain embodiments, the vane apertures may include an area greater than at least one of the plurality of orifice plate apertures. As such, the vane apertures may include an upstream portion that has a greater area than a downstream portion.

In operation, the method may further include flowing the fluid out of the valve body downstream of the at least one orifice plate aperture. After flowing through the guide vane and the orifice plate, the flow dynamics of the fluid may be changed to, for example, change flow rate, velocity, or change the fluid pressure.

Additionally, although not shown, the method may include decreasing a relative erosion parameter by directing the fluid into the guide vane and focusing the fluid to flow into the at least one orifice plate aperture in some embodiments. An erosion parameter may include an erosion or wear over time, such as in inches/year. By decreasing an erosion parameter, the life of internal components, such as orifice plates may be increased. Additionally, by flowing the fluid through a guide vane, the guide vane may receive wear that reduces the wear to orifice plate, thereby allowing the guide vane to be serviced or replaced without having to replace the relatively more expensive orifice plate.

While the present disclosure may have been shown and described with reference to various embodiments thereof, it will be understood by those skilled in the art that various changes in form and details may be made therein without departing from the spirit and scope of the present disclosure as defined by the appended claims and their equivalents. In other words, the various exemplary embodiments disclosed in the present specification and drawings are merely specific embodiments to facilitate an understanding of the various aspects of the present disclosure and are not intended to limit the scope of the present disclosure. Therefore, the scope of the present disclosure is defined not by the detailed description of the disclosure but by the appended claims, and all differences within the scope should be construed as being included in the present disclosure.

What is claimed is:

1. A choke valve, comprising:
    a valve body having an internal cavity; and
    an orifice plate disposed within the internal cavity of the valve body to control a flow of fluid though the choke valve;
    the orifice plate including:
        a center point and being rotatable about a center axis extending longitudinally through the center point; and
        a first aperture extending through a face of the orifice plate, the first aperture defining a first equi-incremental phase region, the first aperture being spaced away from the center point of the orifice plate,
    wherein:
        rotation of the orifice plate with respect to the center point effects transitioning of the orifice plates among a plurality of open states, including:
            rotation of the orifice plate in a first direction with respect to the center point effects an equal incremental increase in fluid flow per degree of rotation in an open area of the first equi-incremental phase region; and
            rotation of the orifice plate in a second direction, the second direction opposite the first direction, effects an equal incremental decrease in fluid flow per degree of rotation in the open area of the first equi-incremental phase region;
    wherein the first aperture further includes a semi-circular section extending from the first equi-incremental phase region and defining a second equi-incremental phase region.

2. The choke valve of claim 1, wherein:
the second equi-incremental phase region defines an opening including:
- a first arc boundary having a first arc center point that is shared with the center point of the orifice plate and a first arc radius;
- a second arc boundary having a second arc center point that is shared with the center point of the orifice plate and a second arc radius, the second arc radius being greater than the first arc radius.

3. The choke valve of claim 2, wherein:
the first aperture includes chamfered edges.

4. The choke valve of claim 1, wherein:
the orifice plate further comprises a second aperture, the second aperture having a configuration that is equal to the first aperture.

5. The choke valve of claim 4, wherein:
rotation of the orifice plate effects a corresponding simultaneous opening or closing of both of the first aperture and the second aperture.

6. The choke valve of claim 4, wherein:
the first aperture and the second aperture are disposed 180 degrees apart from one another.

7. The choke valve of claim 1, further comprising:
a guide vane disposed in the valve body upstream of the orifice plate, the guide vane comprising at least one vane aperture to direct the flow of fluid into the first aperture.

8. The choke valve of claim 7, wherein:
the guide vane comprises a first vane aperture and a second vane aperture, the first vane aperture being disposed 180 degrees apart from one another to the second vane aperture.

9. The choke valve of claim 8, wherein:
the first vane aperture and the second vane aperture together define a guide space;
the at least one aperture defines a maximum open aperture space; and
the guide space is greater than the maximum open aperture space.

10. The choke valve of claim 7, wherein:
each of the first vane aperture and the second vane aperture is generally kidney shaped; and
the guide space tapers from an inlet side defining a first inner area to an outlet side defining a second inner area, the second inner area being less than the first inner area.

11. The choke valve of claim 1, wherein:
each of the equal incremental increases in the fluid flow per the degree of rotation in the open area are proportionate to one another and each of the equal incremental decreases in the fluid flow per the degree of rotation in the open area are proportionate to one another.

12. The choke valve of claim 1, wherein:
the second equi-incremental phase region is spatially defined circumferentially between a first edge of the first equi-incremental phase region and a second edge of the first equi-incremental phase region.

13. The choke valve of claim 1, wherein:
the first equi-incremental phase region defines a first portion of an opening including:
- a first edge having a first edge center point that is shared with the center point of the orifice plate and a first edge radius; and
- a second edge having a second edge center point that is shared with the center point of the orifice plate and a second edge radius;

the second equi-incremental phase region defines a second portion of an opening including:
- a first arc boundary having a first arc center point that is shared with the center point of the orifice plate and a first arc radius;
- a second arc boundary having a second arc center point that is shared with the center point of the orifice plate and a second arc radius;
each of the first arc radius and the second arc radius being longer than at least one of the first edge radius and the second edge radius, each of the first arc radius and the second arc radius being shorter than at least one of the first edge radius and the second edge radius.

14. A method of flowing a fluid through a choke valve, the method comprising:
flowing the fluid into a valve body of the choke valve;
focusing the fluid to flow into an orifice plate aperture of an orifice plate disposed in the valve body, the orifice plate defining a face, the orifice plate aperture extending through the face;
flowing the fluid out of the valve body downstream of the at least one orifice plate aperture; and
rotating the orifice plate to adjust opening and closing of the orifice plate to control a rate of flow of the fluid, rotation of the orifice plate in a first direction effecting an equal increment opening of the orifice plate aperture and rotation of the orifice plate in a second direction that is opposite the first direction effecting an equal increment closing the orifice plate aperture;
wherein
the valve body defines an internal cavity; and
the orifice plate controls a flow of fluid through the choke valve, the orifice plate being disposed within the internal cavity of the valve body;
wherein:
the orifice plate includes:
- a center point and being rotatable about a center axis extending longitudinally through the center point; and
- a first aperture extending through a face of the orifice plate, the first aperture defining a first equi-incremental phase region, the first aperture being spaced away from the center point of the orifice plate;
and wherein the first aperture further includes a semicircular section extending from the first equi-incremental phase region and defining a second equi-incremental phase region.

15. The method of claim 14, further comprising:
rotating the orifice plate with respect to the center point to effect transitioning of the orifice plates among a plurality of open states, including:
rotation of the orifice plate in a first direction with respect to the center point effects an equal incremental increase in fluid flow per degree of rotation in an open area of the first equi-incremental phase region; and
rotation of the orifice plate in a second direction, the second direction opposite the first direction, effects an equal incremental decrease in fluid flow per degree of rotation in the open area of the first equi-incremental phase region.

16. The method of claim 15, wherein:
each of the equal incremental increases in the fluid flow per the degree of rotation in the open area are proportionate to one another and each of the equal incremental decreases in the fluid flow per the degree of rotation in the open area are proportionate to one another.

17. The method of claim 14, wherein:
the second equi-incremental phase region is spatially defined circumferentially between a first edge of the first equi-incremental phase region and a second edge of the first equi-incremental phase region.

18. The method of claim 14, wherein:
the first equi-incremental phase region defines a first portion of an opening including:
  a first edge having a first edge center point that is shared with the center point of the orifice plate and a first edge radius; and
  a second edge having a second edge center point that is shared with the center point of the orifice plate and a second edge radius;
the second equi-incremental phase region defines a second portion of an opening including:
  a first arc boundary having a first arc center point that is shared with the center point of the orifice plate and a first arc radius;
  a second arc boundary having a second arc center point that is shared with the center point of the orifice plate and a second arc radius;
each of the first arc radius and the second arc radius being longer than at least one of the first edge radius and the second edge radius, each of the first arc radius and the second arc radius being shorter than at least one of the first edge radius and the second edge radius.

19. An orifice plate for a choke valve including a valve body having an internal cavity, the orifice plate comprising:
  a center point and being rotatable about a center axis extending longitudinally through the center point when the orifice plate is disposed within the internal cavity of the valve body; and
  a first aperture extending through a face of the orifice plate, the first aperture defining at least a first equi-incremental phase region, the first aperture being spaced away from the center point of the orifice plate, wherein:
    rotation of the orifice plate with respect to the center point effects transitioning of the orifice plate among a first plurality of open states, including:
      rotation of the orifice plate in a first direction with respect to the center point effects an equal incremental increase in fluid flow per degree of rotation in an open area of the first equi-incremental phase region and
      an equal incremental decrease in fluid flow per degree of rotation in the open area of the first equi-incremental phase region during rotation of the orifice plate in a second direction opposite the first direction;

wherein:
the first aperture further includes a semi-circular section extending from the first equi-incremental phase region and defining a second equi-incremental phase region.

20. The orifice plate of claim 19, wherein:
each of the equal incremental increases in the fluid flow per the degree of rotation in the open area are proportionate to one another and each of the equal incremental decreases in the fluid flow per the degree of rotation in the open area are proportionate to one another.

21. The orifice plate of claim 20, wherein:
the second equi-incremental phase region defines an opening including:
  a first arc boundary having a first arc center point that is shared with the center point of the orifice plate and a first arc radius;
  a second arm boundary having a second arc center point that is shared with the center point of the orifice plate and a second arc radius, the second arc radius being greater than the first arc radius.

22. The orifice plate of claim 20, wherein:
the orifice plate further comprises a second aperture, the second aperture having a configuration that is equal to the first aperture.

23. The orifice plate of claim 19, wherein:
the second equi-incremental phase region is spatially defined circumferentially between a first edge of the first equi-incremental phase region and a second edge of the first equi-incremental phase region.

24. The orifice plate of claim 19, wherein:
the first equi-incremental phase region defines a first portion of an opening including:
  a first edge having a first edge center point that is shared with the center point of the orifice plate and a first edge radius; and
  a second edge having a second edge center point that is shared with the center point of the orifice plate and a second edge radius;
the second equi-incremental phase region defines a second portion of an opening including:
  a first arc boundary having a first arc center point that is shared with the center point of the orifice plate and a first arc radius;
  a second arc boundary having a second arc center point that is shared with the center point of the orifice plate and a second are radius;
  each of the first arc radius and the second arc radius being longer than at least one of the first edge radius and the second edge radius, each of the first arc radius and the second arc radius being shorter than at least one of the first edge radius and the second edge radius.

* * * * *